(12) United States Patent
Xu et al.

(10) Patent No.: US 11,533,138 B2
(45) Date of Patent: Dec. 20, 2022

(54) METHOD, DEVICE, AND STORAGE MEDIUM FOR PROCESSING DATA FLOW

(71) Applicant: GUANGDONG OPPO MOBILE TELECOMMUNICATIONS CORP., LTD., Guangdong (CN)

(72) Inventors: Yang Xu, Guangdong (CN); Xin You, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/306,696

(22) Filed: May 3, 2021

(65) Prior Publication Data
US 2021/0258111 A1    Aug. 19, 2021

Related U.S. Application Data

(63) Continuation of application No. PCT/CN2019/071676, filed on Jan. 14, 2019.

(51) Int. Cl.
*H04L 1/22* (2006.01)
*H04L 47/2483* (2022.01)
(Continued)

(52) U.S. Cl.
CPC ............ *H04L 1/22* (2013.01); *H04L 47/2483* (2013.01); *H04L 47/34* (2013.01);
(Continued)

(58) Field of Classification Search
CPC ... H04W 72/14; H04W 76/12; H04W 72/042; H04W 72/1284; H04W 28/0268; H04W 28/06; H04W 72/1289; H04W 80/10; H04W 76/11; H04W 72/0413; H04W 40/24; H04W 40/34; H04W 76/10; H04W 76/19; H04W 76/22; H04W 28/02; H04W 28/0236; H04W 28/0263; H04W 76/00;
(Continued)

(56) References Cited

U.S. PATENT DOCUMENTS 10,225,046 B2    3/2019    Wang
11,012,887 B2 *  5/2021    Jiang ................. H04W 28/0263
(Continued)

FOREIGN PATENT DOCUMENTS

CN    103001748 A    3/2013
CN    103634299 A    3/2014
(Continued)

OTHER PUBLICATIONS

Park et al. U.S. Appl. No. 62/733,843, filed Sep. 20, 2018 (Year: 2018).*
(Continued)

*Primary Examiner* — Wutchung Chu
(74) *Attorney, Agent, or Firm* — Perkins Coie LLP

(57) ABSTRACT

A method and apparatus for processing a data flow, and a computer storage medium are provided. The data flow processing method includes receiving, by an electronic device, first information, where the first information is used to indicate a transmission manner of data flow(s). The method also includes processing, by the electronic device, the data flow(s) based on the first information.

13 Claims, 12 Drawing Sheets

(51) Int. Cl.
  *H04L 47/34* (2022.01)
  *H04W 36/00* (2009.01)
  *H04W 36/08* (2009.01)
  *H04W 36/18* (2009.01)

(52) U.S. Cl.
  CPC ....... *H04W 36/0033* (2013.01); *H04W 36/08* (2013.01); *H04W 36/18* (2013.01)

(58) Field of Classification Search
  CPC . H04W 36/0033; H04W 36/08; H04W 36/18; H04W 24/04; H04W 28/04; H04W 28/0252; H04W 76/15; H04W 72/005; H04W 28/0278; H04W 36/00837; H04W 72/02; H04W 72/048; H04W 36/0069; H04W 28/065; H04W 4/06; H04W 36/0016; H04W 72/04; H04W 24/10; H04W 72/0446; H04W 72/12; H04W 72/1278; H04W 36/026; H04W 36/02; H04L 1/08; H04L 45/74; H04L 1/189; H04L 5/0098; H04L 1/1816; H04L 1/1858; H04L 47/805; H04L 5/0091; H04L 1/22; H04L 47/2483; H04L 47/34; H04L 43/0858; H04L 1/0025; H04L 1/02; H04L 67/14; H04L 1/0088; H04L 12/42; H04L 5/0053; H04L 1/00; H04L 5/0044; H04L 1/1819; H04L 1/1812; H04L 5/00; H04L 1/0003; H04L 1/0057; H04L 1/18; H04L 45/24; H04L 45/38; H03M 13/13
  See application file for complete search history.

(56) References Cited

U.S. PATENT DOCUMENTS

| | | | |
|---|---|---|---|
| 2010/0235593 A1 | 9/2010 | Yadav et al. | |
| 2013/0089098 A1 | 4/2013 | Mital et al. | |
| 2017/0366618 A1* | 12/2017 | Vrzic | H04L 67/148 |
| 2018/0199331 A1 | 7/2018 | Wang et al. | |
| 2018/0270698 A1* | 9/2018 | Babaei | H04W 72/042 |
| 2018/0270699 A1* | 9/2018 | Babaei | H04W 28/0278 |
| 2018/0270700 A1* | 9/2018 | Babaei | H04W 72/042 |
| 2018/0279229 A1* | 9/2018 | Dinan | H04W 52/367 |
| 2018/0279262 A1* | 9/2018 | Babaei | H04W 72/14 |
| 2018/0279401 A1* | 9/2018 | Hong | H04W 36/0055 |
| 2018/0317130 A1* | 11/2018 | Jin | H04W 24/10 |
| 2018/0324642 A1* | 11/2018 | Yu | H04L 5/0053 |
| 2018/0352601 A1* | 12/2018 | Park | H04L 5/0055 |
| 2018/0367288 A1* | 12/2018 | Vrzic | H04W 36/22 |
| 2019/0215863 A1* | 7/2019 | Kim | H04W 36/06 |
| 2019/0239112 A1* | 8/2019 | Rao | H04W 4/70 |
| 2019/0253917 A1* | 8/2019 | Dao | H04W 28/0268 |
| 2019/0349139 A1* | 11/2019 | Park | H04W 80/08 |
| 2019/0357301 A1* | 11/2019 | Li | H04W 80/10 |
| 2020/0021530 A1* | 1/2020 | Jiang | H04L 47/2483 |
| 2020/0059821 A1* | 2/2020 | Wirth | H04W 28/0268 |
| 2020/0084663 A1* | 3/2020 | Park | H04W 76/27 |
| 2020/0107213 A1* | 4/2020 | Park | H04W 8/06 |
| 2020/0107386 A1* | 4/2020 | Van Phan | H04W 28/0215 |
| 2020/0107392 A1* | 4/2020 | Yi | H04L 1/22 |
| 2020/0112907 A1* | 4/2020 | Dao | H04M 15/84 |
| 2020/0162366 A1* | 5/2020 | Vrzic | H04L 45/16 |
| 2020/0163140 A1* | 5/2020 | Mochizuki | H04W 72/042 |
| 2020/0351700 A1* | 11/2020 | Han | H04W 28/02 |
| 2020/0359356 A1* | 11/2020 | Sirotkin | H04L 1/00 |
| 2020/0374899 A1* | 11/2020 | Ohta | H04W 72/1268 |
| 2020/0382993 A1* | 12/2020 | Zhao | H04W 80/08 |
| 2021/0022040 A1* | 1/2021 | Zhu | H04L 1/1806 |
| 2021/0037595 A1* | 2/2021 | Jin | H04W 76/27 |
| 2021/0105196 A1* | 4/2021 | Dao | H04L 43/028 |
| 2021/0168681 A1* | 6/2021 | Kweon | H04W 36/026 |

FOREIGN PATENT DOCUMENTS

| | | |
|---|---|---|
| CN | 104737594 A | 6/2015 |
| CN | 105933232 A | 9/2016 |
| CN | 106304401 A | 1/2017 |
| CN | 108401484 A | 8/2018 |
| CN | 108401505 A | 8/2018 |
| CN | 108631980 A | 10/2018 |
| CN | 108632934 A | 10/2018 |
| CN | 108874530 A | 11/2018 |
| EP | 3422676 A1 | 1/2019 |

OTHER PUBLICATIONS

Park et al. U.S. Appl. No. 62/730,206, filed on Sep. 12, 2018 (Year: 2018).*
Dao et al. U.S. Appl. No. 62/741,853, filed Oct. 5, 2018 (Year: 2018).*
Isr and Written Opinion of the International Searching Authority of PCT/CN2019/071676 dated Oct. 17, 2019.
3GPP TR 23.725 V0.3.0—3rd Generation Partnership Project; Technical Specification Group Services and System Aspects; Study on enhancement of Ultra-Reliable Low-Latency Communication (URLLC) support in the 5G Core network (5GC) (Release 16) (Jul. 2018).
3GPP TS 23.502 V15.4.0—3rd Generation Partnership Project; Technical Specification Group Services and System Aspects; Procedures for the 5G System; Stage 2 (Release 15) (Dec. 2018).
3GPP TS 37.340 V15.4.0 (Dec. 2018), 3rd Generation Partnership Project; Technical Specification Group Radio Access Network; Evolved Universal Terrestrial Radio Access (E-UTRA) and NR; Multi-connectivity; Stage 2 (Release 15).
3GPP TR 23.725 V1.2.0 (Dec. 2018), 3rd Generation Partnership Project; Technical Specification Group Services and System Aspects; Study on enhancement of Ultra-Reliable Low-Latency Communication (URLLC) support in the 5G Core network (5GC) (Release 16).
First Office Action of the Chinese application No. 202010592566.3, dated Jul. 28, 2021.
Qualcomm Incorporated:"Analysis of URLLC solutions using DC",3GPP Draft; S2-1811944,vol. SA WG2; Nov. 20, 2018,Retrieved from the Internet: URL:http://www.3gpp.org/ftp/Meetings%5F3GPP%5FSYNC/SA2/Docs/S2%2D1811944%2Ezip[retrieved on Nov. 20, 2018], 18 pages.
Supplementary European Search Report in European application No. 19910321.9, dated Oct. 5, 2021 6 pages.
3GPP TR 23.793 V1.1.0 (Oct. 2018), Technical Report, Technical Specification Group Services and System Aspects, Study on Access Traffic Steering, Switching and Splitting support in the 5G system architecture (Release 16). 108 pages.
3GPP TR 23.793 V2.0.1 (Dec. 2018), Technical Report,Technical Specification Group Services and System Aspects, Study on Access Traffic Steering, Switching and Splitting support in the 5G system architecture (Release 16). 115 pages.
3GPP TSG-SA2 Meeting #128 S2-186561, Huawei, HiSilicon, Update of TFCP solution, Jul. 2-6, 2018, Vilnius, Lithuania. 8 pages.
Second Office Action of the Chinese application No. 202010592566.3, dated Nov. 12, 2021. 16 pages with English translation.
Ahmed Shahin et al., "Reliability Improvement Approach Based on Flatness Control of Parallel-Connected Inverters", IEEE Transactions on Power Electronics, 32(1), 681-692.
Huawei et al., "Protocol stack options for Solution#3 and evaluation for Solution#3 and Solution#4", 3GPP SA WG2 Meeting #128bis S2-188905, Aug. 20-24, 2018, Sophia-Antipolis, France. 11 pages.
Notice of Allowance of the Chinese application No. 202010592566.3, dated Feb. 14, 2022. 6 pages with English translation.
First Office Action of the European application No. 19910321.9, dated May 20, 2022. 4 pages.
Examination Report for European Application No. 19910321.9, dated Oct. 26, 2022. 5 pages with English translation.

* cited by examiner

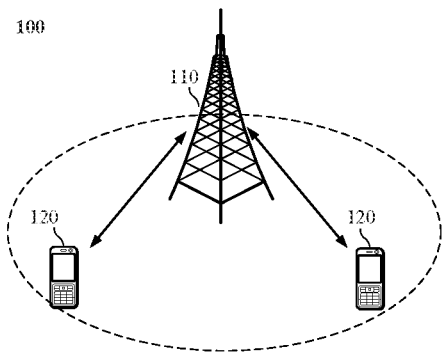
FIG. 10
An electronic device processes data flows based on first information, where the first information is used to indicate a transmission manner of the data flows — S201
FIG. 11
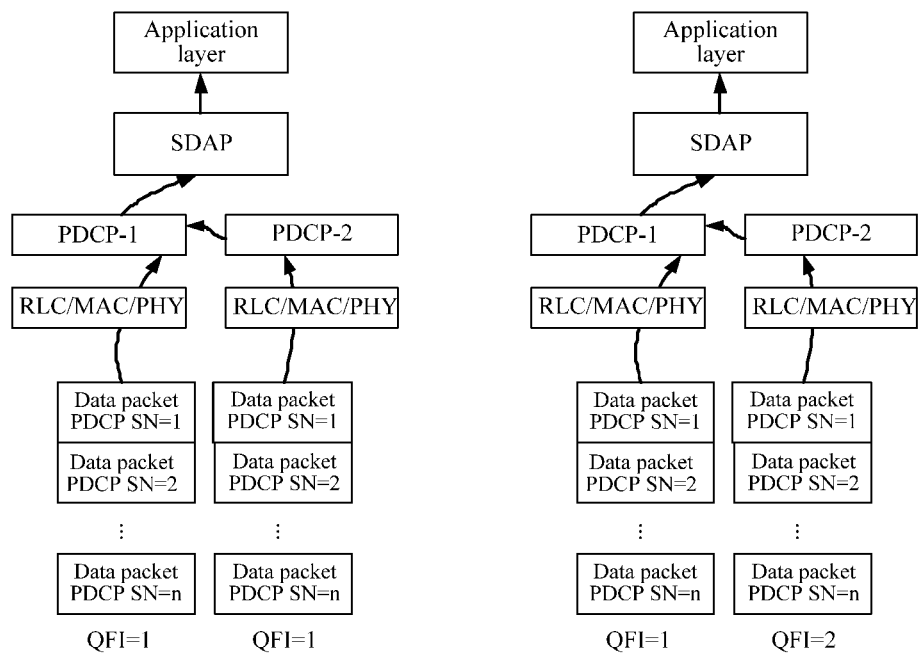
FIG. 12A    FIG. 12B

METHOD, DEVICE, AND STORAGE MEDIUM FOR PROCESSING DATA FLOW

CROSS-REFERENCES TO RELATED APPLICATIONS

This is a continuation application of International Patent Application No. PCT/CN2019/071676, filed on Jan. 14, 2019, the contents of which are hereby incorporated by reference in its entirety.

TECHNICAL FIELD

The present invention relates to wireless communication, and more particularly to a method, a device, and a storage medium for processing data flow(s).

BACKGROUND

In the related art, to achieve efficient transmission of ultra-reliable and low-latency communication (URLLC) service data, that is, to successfully transmit data through another path if a failure occurs on a single path, a redundant transmission mechanism is introduced. When the redundant transmission mechanism is implemented, a feasible solution is to duplicate and deduplicate a data packet in a 3rd Generation Partnership Project (3GPP) layer. In this case, all of the duplicated data flows have a same Quality of Service (QoS) flow identifier (QFI).

In addition, to achieve a seamless handover or a fast handover between cells in a URLLC scenario, a terminal device remains connected to both a source base station and a target base station during a specific time, and transmits same data to the source base station and the target base station, i.e., to implement redundant transmission. In this case, a QFI used by the terminal device for data transmission to the source base station is the same as that used by the terminal device for data transmission to the target base station. However, transmission of a plurality of data flows having a same QFI based on different paths is not supported in a 3GPP protocol architecture in the related art.

SUMMARY OF THE INVENTION

To resolve the aforesaid technical problem, embodiments of the present invention provide a method, a device, and a storage medium for processing data flow(s), which can achieve redundant transmission of a same data packet based on a plurality of data flows with different QFIs.

According to a first aspect, an embodiment of the present invention provides a data flow processing method, including: receiving, by an electronic device, first information, wherein the first information is used to indicate a transmission manner of data flow(s); and processing, by the electronic device, the data flow(s) based on the first information.

According to a second aspect, an embodiment of the present invention provides an electronic device. The electronic device includes a transceiver unit, configured to receive first information, wherein the first information is used to indicate a transmission manner of data flow(s); and a processing unit, configured to process the data flow(s) based on the first information.

According to a third aspect, an embodiment of the present invention provides a terminal device, including a processor and a memory configured to store a computer program executable on the processor, wherein the processor is configured to, when running the computer program, perform steps of the data flow processing method performed by the aforesaid terminal device.

According to a fourth aspect, an embodiment of the present invention provides a base station, including a processor and a memory configured to store a computer program executable on the processor, wherein the processor is configured to, when running the computer program, perform steps of the data flow processing method performed by the aforesaid base station.

According to a fifth aspect, an embodiment of the present invention provides a user plane function entity, including a processor and a memory configured to store a computer program executable on the processor, wherein the processor is configured to, when running the computer program, perform steps of the method performed by the aforesaid terminal device.

According to a sixth aspect, an embodiment of the present invention provides a network device, including a processor and a memory configured to store a computer program executable on the processor, wherein the processor is configured to, when running the computer program, perform steps of the method performed by the aforesaid user plane function entity.

According to a seventh aspect, an embodiment of the present invention provides a storage medium, storing an executable program, wherein the executable program, when executed by a processor, implements the method performed by the aforesaid terminal device.

According to an eighth aspect, an embodiment of the present invention provides a storage medium, storing an executable program, wherein the executable program, when executed by a processor, implements the method performed by the aforesaid base station.

According to a ninth aspect, an embodiment of the present invention provides a storage medium, storing an executable program, wherein the executable program, when executed by a processor, implements the method performed by the aforesaid user plane function entity.

In the data flow processing method provided by the embodiments of the present invention, an electronic device receives first information, wherein the first information is used to indicate a transmission manner of data flow(s). The electronic device processes the data flow(s) based on the first information. Wherein, the transmission manner of the data flow(s) includes: performing redundancy addition processing, redundancy removal, and/or reordering on a data packet in the data flow(s). The transmission manner of the data flow(s) includes: transmitting data flow(s) having a first QFI based on at least two paths; or transmitting a same data packet through data flows having different QFIs. In this way, redundant transmission can be performed on a same data packet through data flows having different QFIs, without changing the condition that data flow(s) with one QFI cannot correspond to a plurality of Packet Data Convergence Protocol (PDCP) entities in an access network under a current protocol architecture.

BRIEF DESCRIPTION OF THE DRAWINGS

FIG. 10 is a schematic composition structural diagram of a communication system according to an embodiment of the present invention;

FIG. 11 is an optional schematic processing flowchart of a data flow processing method according to an embodiment of the present invention;

FIG. 12A is a schematic diagram 1 of a first manner in which a terminal device performs duplication and transmission processing on a data packet in data flow(s) according to an embodiment of the present invention:

FIG. 12B is a schematic diagram 2 of a first manner in which a terminal device performs duplication and transmission processing on a data packet in data flow(s) according to an embodiment of the present invention:

DETAILED DESCRIPTION OF THE INVENTION

For characteristics and technical content of embodiments of the present invention to be known in a more detailed manner, the following describes implementation of the embodiments of the present invention in detail with reference to the accompanying drawings. The provided accompanying drawings are only for reference and description, and are not intended to limit the embodiments of the present invention.

Redundant transmission of a data packet is first briefly described before the embodiments of the present invention are described in detail.

Figure 1:
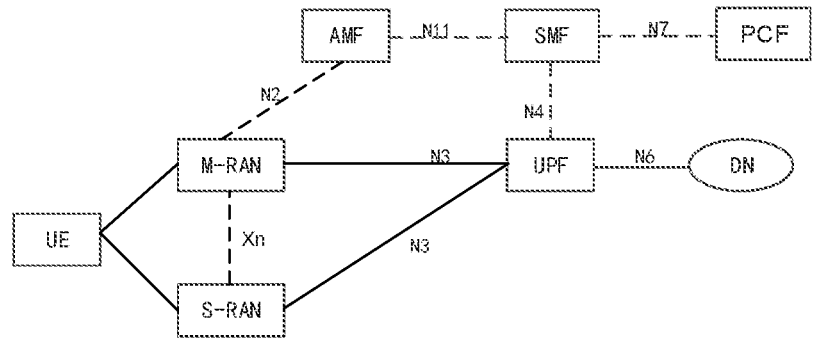
FIG. 1 is a schematic diagram of duplicating and deduplicating a data packet in a 3GPP layer according to the present invention.
Figure 2:
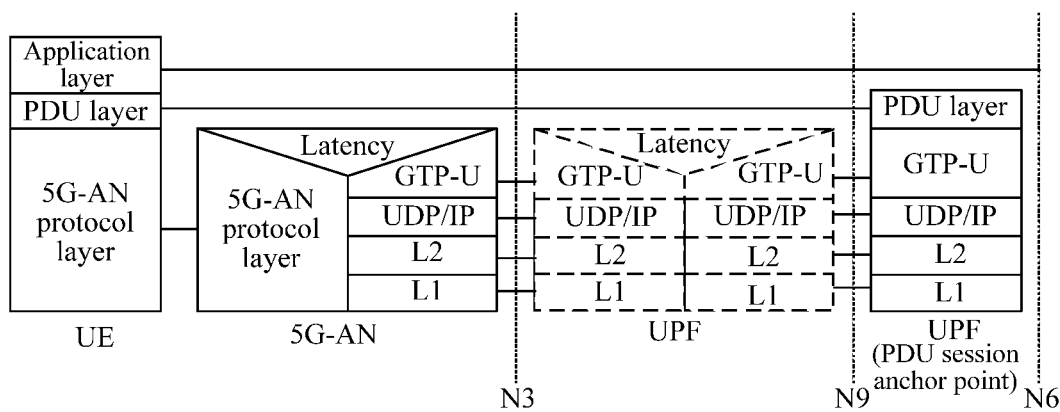
FIG. 2 is a schematic diagram of a protocol stack according to the present invention.

FIG. 1 is a schematic diagram of duplicating and deduplicating a data packet in a 3GPP layer. As shown in FIG. 1, in a downlink transmission direction, i.e., a data packet is sent by a user plane function (UPF) entity to a master radio access network (M-RAN) and a secondary radio access network (S-RAN), and then sent by the M-RAN and the S-RAN to a user equipment (UE), a data packet sent by an external application server to the UPF entity is duplicated in the UPF, and is transmitted through different paths. In an uplink transmission direction, a data packet is duplicated by a terminal device in a protocol stack of the 3GPP layer, and is transmitted to the UPF through different paths for deduplication. In a protocol stack shown in FIG. 2, duplication/deduplication is performed in a GPRS Tunneling Protocol layer on the UPF (GTP-U). On a terminal device side, duplication/deduplication is performed in a Service Data Adaptation Protocol (SDAP) layer or a PDCP layer. An access network device, such as a base station, needs to perform an operation of transferring a protocol.

Figure 3:
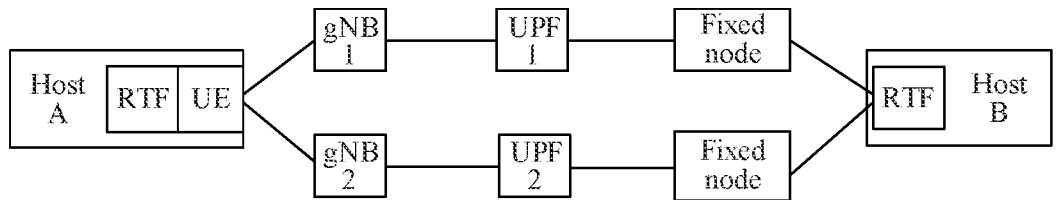
FIG. 3 is a schematic diagram of duplicating and deduplicating a data packet in an application layer according to the present invention.

When a redundant transmission mechanism is implemented, in addition to the duplicating and deduplicating a data packet in a 3GPP layer shown in FIG. 1, another feasible manner is to duplicate and deduplicate a data packet in an application layer, as shown in FIG. 3. Redundancy transmission functionality (RTF) provided by an upper layer is used to duplicate a data packet on a transmit end and deduplicate the same data packet on a receive end. During a data packet transmission process, the 3GPP layer ensures that duplicated data is transmitted through two different paths. Network nodes included by the two different paths include a first base station, a first UPF, a first fixed node; a second base station, a second UPF, and a second fixed node respectively.

Figure 4:
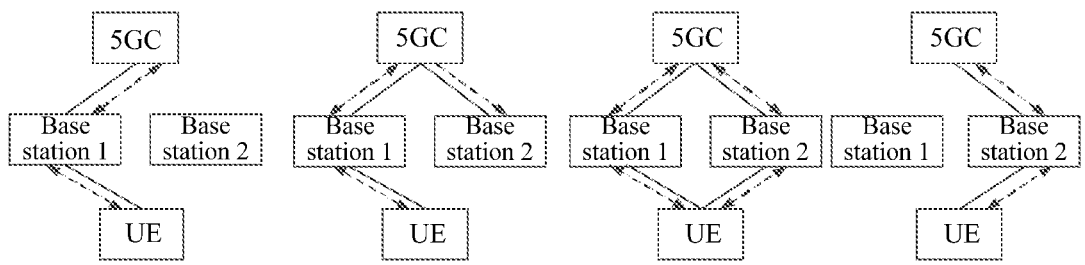
FIG. 4 is a schematic flowchart of a handover of "establishment first and handover later" according to the present invention.
Figure 5:
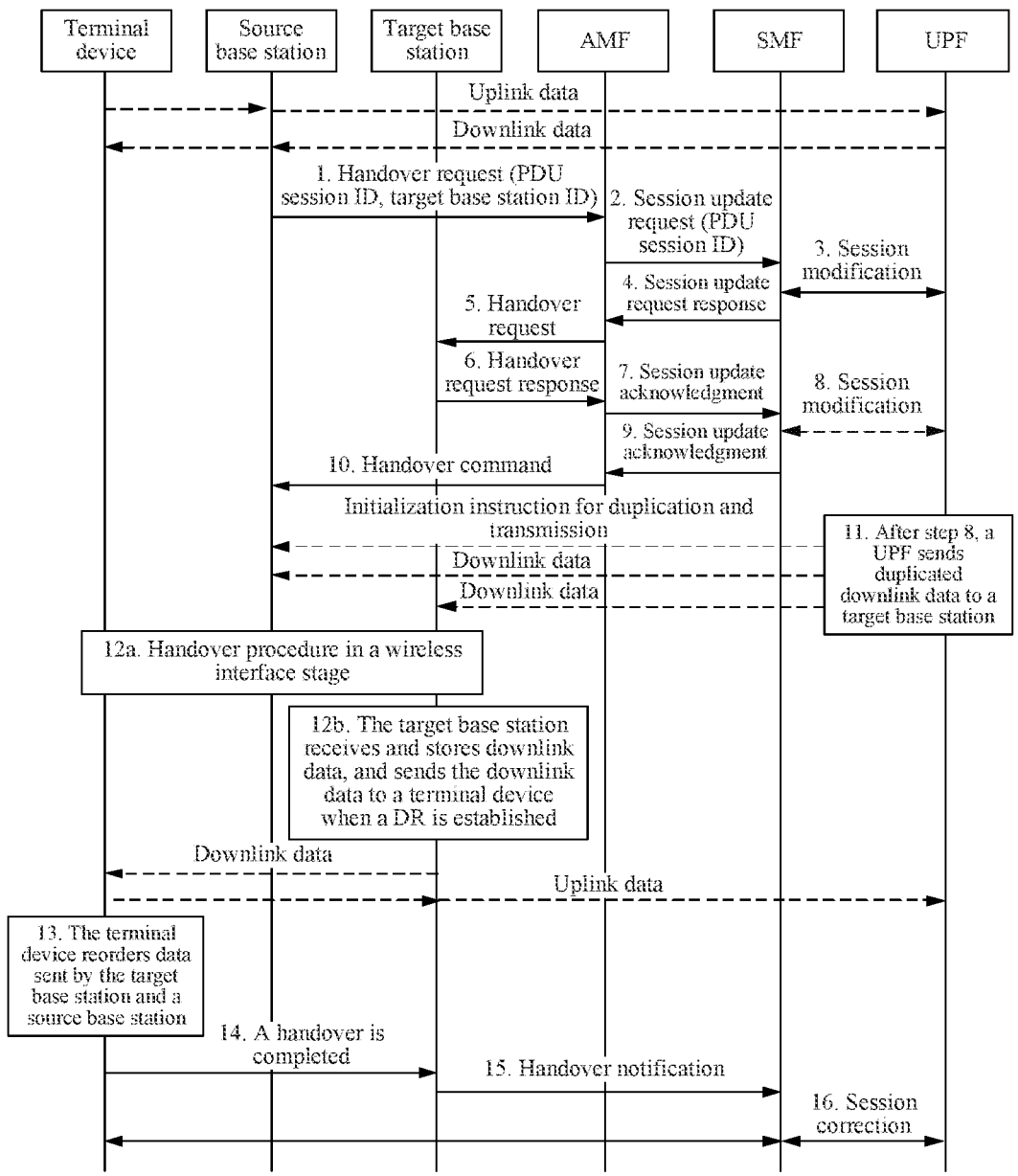
FIG. 5 is a schematic processing flowchart of implementing a seamless handover between cells of "establishment first and handover later" based on an N2 interface according to the present invention.

The following briefly describes a process of a seamless handover between cells. A feasible solution for achieving a seamless handover between cells is to perform a handover process of "establishment first and handover later", as shown in FIG. 4. When remaining connected to a source base station, a terminal device initiates a connection establishment request to a target base station, and transmits same URLLC data. A processing procedure of a seamless handover between cells of "establishment first and handover later" is implemented based on an N2 interface, as shown in FIG. 5: In step 1 to step 9, a source base station initiates an HO request message, and a session management function (SMF) entity or an access and mobility management function (AMF) entity on a core network side establishes a protocol data unit (PDU) session (including interaction between a target base station and a core network UPF) on a target side. In step 10, the AMF sends an HO Command message to the source base station, and informs the source base station that an HO preparation stage has been completed. In step 11 and step 12B, the UPF begins to send URLLC data to the target base station. The data is the same as URLLC data sent by the UPF to the source base station, that is, redundant transmission. As shown by dashed lines in FIG. 5, the UPF simultaneously sends same URLLC data to both the source and target base station. In this case, it is likely that the target base station has not established a connection to UE. Therefore, data sent from the UPF may be cached, and the cached data or a part of the cached data is sent to a terminal device after the connection is established. In step 12A, after receiving the HO Command message sent by the AMF, the source base station sends an HO Command to the terminal device, and triggers the terminal device to perform an air interface handover process on the target base station. In step 13, the terminal device may simultaneously receive the URLLC data from the source and target base stations (i.e., redundant transmission) within a short time. The terminal device performs reordering and redundancy removal on the received redundant data, and then delivers the data to an application layer. In steps 14 to 16, after the air interface handover is completed, the terminal device sends an HO Complete message to a network side, and the network side deletes the connection to the source base station according to the message. The whole handover process is completed.

Figure 6:
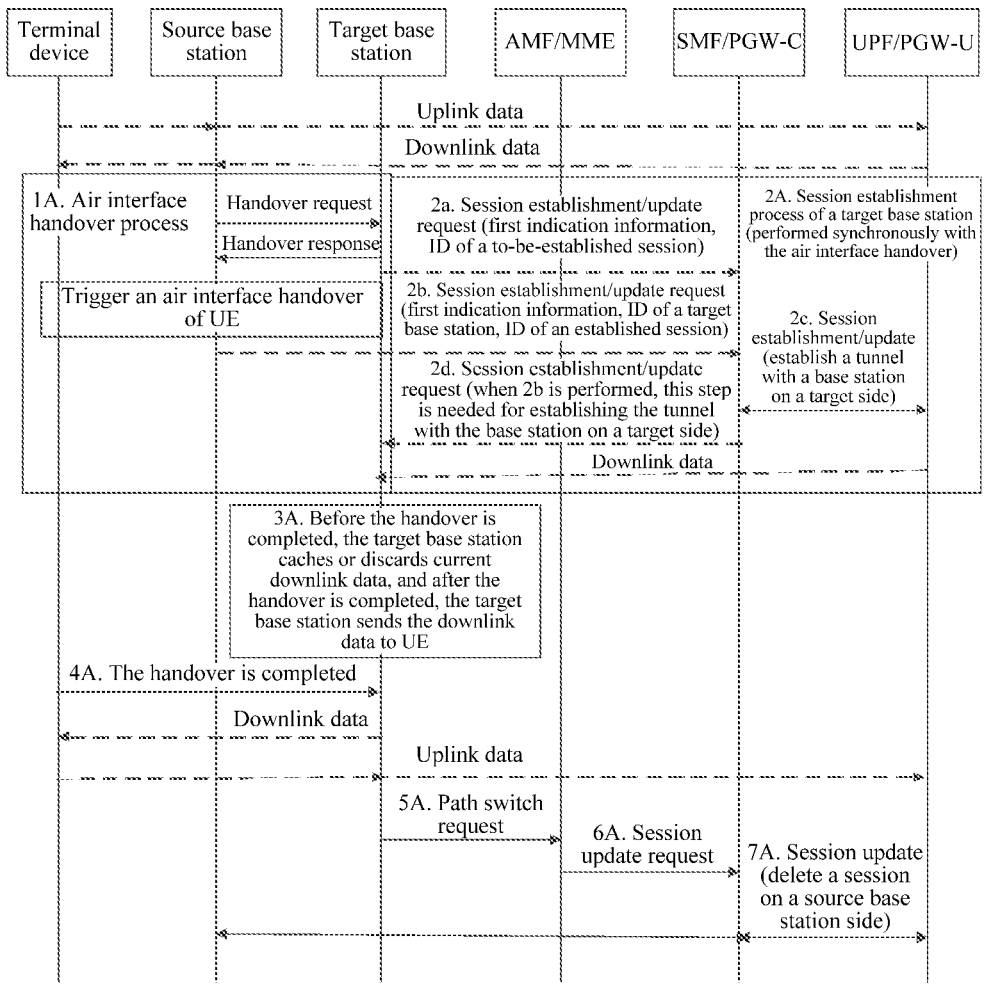
FIG. 6 is a schematic flowchart of a fast handover between cells according to the present invention.

The following briefly describes a procedure of a fast handover between cells. As shown in FIG. 6, step 1A and step 2A are an air interface handover process. For a session that needs a fast handover, two IP addresses are allocated for paths of a source base station and a target base station respectively. In a session 1 corresponding to the source base station and a session 2 corresponding to the target base station, a same data flow is transmitted, and a same QoS policy is executed. In step 3A, a session between the target base station and a UPF has been established. The UPF simultaneously sends a same downlink data packet to the source base station and the target base station. Because in this case, a handover to the target base station is not completed, and there is no data resource bearer (DRB), the target base station may cache or discard a currently received data packet. In step 4A, after the handover is completed or the target base station establishes a DRB, the target base station sends a cached data packet and a real-time downlink data packet to a terminal device. In steps 5A to 7A, a core network device releases a session corresponding to the source base station.

Figure 7:
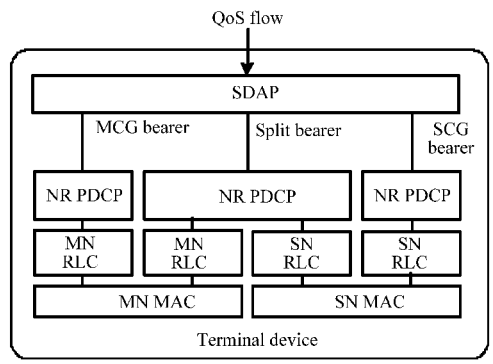
FIG. 7 is a schematic diagram of a protocol stack of a dual-connectivity architecture of a terminal device according to the present invention.
Figure 8:
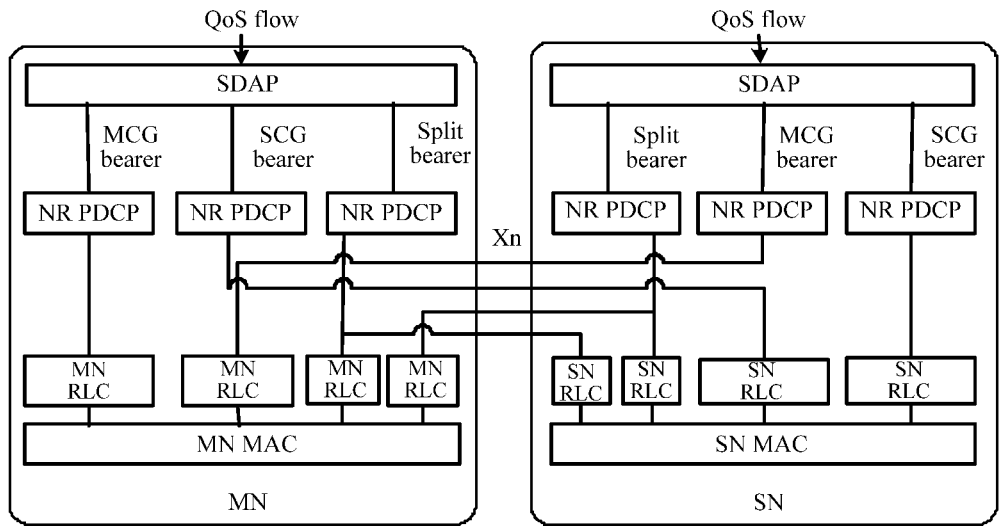
FIG. 8 is a schematic diagram of a protocol stack of a dual-connectivity architecture of an access network according to the present invention.

It can be seen that, in both the seamless handover process and the fast handover process, there is a case in which a same data packet is transmitted through at least two data flows, and the at least two data flows through which a same data packet is transmitted use a same QFI. However, this is not supported by a 3GPP protocol architecture. In a 3GPP protocol, a protocol stack of a dual-connectivity (DC) architecture of a terminal device is shown in FIG. 7, and a protocol stack of a DC architecture of an access network is shown in FIG. 8. It can be known from the protocol stacks shown in FIG. 7 and FIG. 8 that, each DC bearer corresponds to one PDCP entity on an MN or an SN, and one QoS flow can be served by only one PDCP entity on the MN or the SN.

Figure 9:
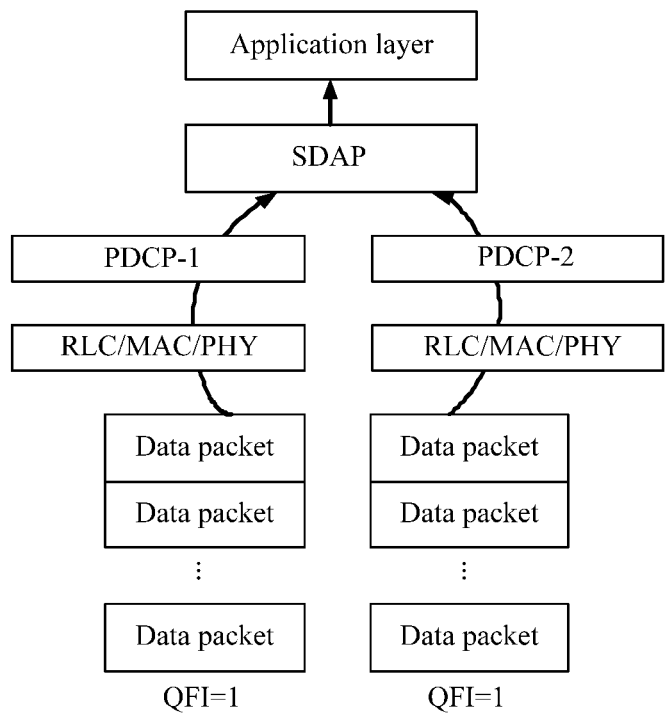
FIG. 9 is a schematic diagram showing that data packets in data flows having a same QFI are delivered to an SDAP layer through two PDCP entities.

However, in all of the seamless handover between cells, the fast handover between cells, and the duplicating and deduplicating a data packet in a 3GPP layer, at least two QoS flows with a same QFI need to be respectively served by two PDCP entities on the MN and the SN. This is not supported by a current 3GPP protocol architecture. During actual transmission, as shown in FIG. 9, when data packets in data flows having a same QFI are respectively delivered to an SDAP layer through two PDCP entities, an SDAP entity, however, cannot recognize and determine whether the received data packets having a same QFI are redundantly transmitted, and how to perform redundant transmission processing.

Based on the aforesaid problems, the present invention provides a data flow processing method. The data flow processing method in the embodiments of the present invention may be applied to various communication systems, such as a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, or a 5G system.

For example, a communication system 100 used in an embodiment of this application is shown in FIG. 10. The communication system 100 may include a network device 110, and the network device 110 may be a device communicating with a terminal device 120 (or referred to as a communication terminal or a terminal). The network device 110 may provide communication coverage for a specific geographical area, and may communicate with a terminal device that is located in the covered area. Optionally, the network device 110 may be a base transceiver station (BTS) in a GSM system or a CDMA system, a NodeB (NB) in a WCDMA system, an evolved NodeB (eNB or eNodeB) in an LTE system, or a wireless controller in a cloud radio access network (CRAN). Alternatively, the network device may be a network side device in a mobile switching center, a relay station, an access point, an in-vehicle device, a wearable device, a hub, a switch, a bridge, a router, or a 5G network, or may be a network device or the like in a future evolved public land mobile network (PLMN).

The communication system 100 further includes at least one terminal device 120 located inside a coverage area of the network device 110. The "terminal device" used herein includes, but is not limited to, being connected through: a wired line, for example, through a public switched telephone network (PSTN), a digital subscriber line (DSL), a digital cable, or a direct cable; and/or another data connection/network; and/or a wireless interface, for example, for a cellular network, a wireless local area network (WLAN), a digital television network such as a DVB-H network, a satellite network, or an AM-FM broadcast transmitter; and/or an apparatus of another terminal device that is configured to receive/send communication signals and/or an Internet of Things (IoT) device. The terminal device that is configured to communicate through the wireless interface may be referred to as a "wireless communication terminal", a "wireless terminal", or a "mobile terminal". An example of the mobile terminal includes, but is not limited to, a satellite or a cellular phone; a personal communication system (PCS) terminal that combines a cellular radio telephone, data processing, fax, and data communication capabilities; a PDA that may include a radio telephone, a beeper, Internet/Intranet access, a web browser, a memo pad, a calendar, and/or a global positioning system (GPS) receiver; and a conventional laptop and/or palmtop receiver or another electronic apparatus including a radio telephone transceiver. The terminal device may be an access terminal, user equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN, or the like.

Optionally, a 5G system or a 5G network may also be referred to as a new radio (NR) system or an NR network.

FIG. 10 illustratively shows one network device and two terminal devices. Optionally, the communication system 100 may include a plurality of network devices, and in a coverage area of each network device, another quantity of terminal devices may be included. This is not limited in the embodiments of this application.

Optionally, the communication system 100 may further include other network entities such as a network controller and a mobility management entity. This is not limited in the embodiments of this application.

It should be understood that, in a network/system in the embodiments of this application, a device having a communication function may be referred to as a communication device. Using the communication system 100 shown in FIG. 10 as an example, the communication device may include a network device 110 and a terminal device 120 that each have a communication function. The network device 110 and the terminal device 120 can be specific devices described above. Details are not described herein again. The communication device may further include other devices in the communication system 100, for example, other network entities such as a network controller and a mobility management entity. This is not limited in the embodiments of this application.

As shown in FIG. 11, an optional processing procedure of a data flow processing method applied to a terminal device according to an embodiment of the present invention includes the following steps:

Step S201. An electronic device processes data flow(s) based on first information, where the first information is used to indicate a transmission manner of the data flow(s).

In this embodiment of the present invention, the electronic device may be a base station, a core network device, or a terminal device. The first information may be received by the electronic device, or may be pre-configured. When the electronic device is the base station or the terminal device, the first information is sent by a core network element (such as an SMF). The transmission manner of the data flow(s) includes: a manner of performing, by the electronic device, duplication and transmission processing on a data packet in the data flow(s). The transmission manner of the data flow(s) further includes: transmitting data flow(s) having a first QFI based on at least two paths; or transmitting a same data packet through data flows having different QFIs. When different data flows belong to different sessions, the first information is further used to indicate a session identifier ID to which each data flow belongs. The transmission manner of the data flow(s) includes: performing redundant transmission on the data flow(s) based on a core network tunnel; and/or preforming redundant transmission on the data flow(s) based on an air interface connection.

In some embodiments, using an example in which the electronic device is a terminal device, a first manner in which the terminal device performs duplication and transmission processing on a data packet in the data flow(s) includes: sending, by a second PDCP entity of the terminal device, a data packet having a serial number (SN) to a first PDCP entity of the terminal device; and performing, by the first PDCP entity, duplication and transmission processing on the received data packet based on the SN. For data for downlink transmission, after receiving the data packet sent by the second PDCP entity, the first PDCP entity first performs redundancy removal and/or reordering processing on the data packet based on the SN, and then delivers the data packet on which the redundancy removal and/or reordering processing have or has been performed to an SDAP layer. FIG. 12A is a schematic diagram 1 of the first manner in which the terminal device performs duplication and transmission processing on a data packet in the data flow(s). As shown in FIG. 12A, a QFI of data flow(s) corresponding to a data packet received by a first PDCP entity is the same as that of data flow(s) corresponding to a data packet received by a second PDCP entity. FIG. 12B is a schematic diagram 2 of the first manner in which the terminal device performs duplication and transmission processing on a data packet in the data flow(s), and a QFI of data flow(s) corresponding to a data packet received by a first PDCP entity is different from that of data flow(s) corresponding to a data packet received by a second PDCP entity. For data for uplink transmission, after receiving a data packet sent by an SDAP entity, the first PDCP entity performs redundancy addition processing on the data packet based on an SN. Optionally, the redundancy addition processing refers to duplicating a data packet in the data flow(s), and/or adding a same SN for a same data packet. During specific implementation, the redundancy addition processing is that when duplicating a data packet, the first PDCP entity may add a same SN for a same data packet in a layer other than a PDCP layer, for example, an application layer over the PDCP layer.

Then, the first PDCP entity sends the duplicated data packet to the second PDCP entity. The first PDCP entity and the second PDCP entity respectively send the data packets to underlying entities corresponding to the first PDCP entity and the second PDCP entity.

When a QFI of data flow(s) corresponding to a data packet received by the first PDCP entity is different from that of data flow(s) corresponding to a data packet received by the second PDCP entity, that is, one PDCP entity serves only one data flow, so that addition of an SN caused by transmission in another data flow on a same PDDP entity can be avoided. During specific implementation, a set of independent SNs may further be maintained for each data flow. Alternatively, data flow(s) that are duplicated and transmitted are mapped to a same DRB ID. For example, a first data flow is duplicated to obtain a second data flow and a third data flow, and the first data flow, the second data flow, and the third data flow are configured to have a same DRB ID. In this case, both the first PDCP entity and the second PDCP entity include the first data flow, the second data flow, and the third data flow.

The first information herein is used to instruct the second PDCP entity to send a data packet to the first PDCP entity. When a QFI of data flow(s) corresponding to a data packet received by the first PDCP entity is different from that of data flow(s) corresponding to a data packet received by the second PDCP entity, the first information is used to instruct the second PDCP entity to send a data packet corresponding to a second QFI to the first PDCP entity, and/or the first information is used to instruct the second PDCP entity to send a data packet corresponding to a third QFI having a mapping relationship with the second QFI to the first PDCP entity. In this way, a core network device can explicitly indicate a session performing redundant transmission or a data flow performing redundant transmission, so that the terminal device and a base station can allocate corresponding resources, and trigger corresponding data exchange. For example, the mapping relationship between the second QFI and the third QFI is pre-stored. The first information is used to instruct the second PDCP entity to send a data packet corresponding to the second QFI to the first PDCP entity, and instructing a third PDCP entity to send a data packet corresponding to the third QFI to the first PDCP entity. When different PDCP entities correspond to a same DRB ID, the first information is used to instruct the second PDCP entity corresponding to a first DRB ID to send the data packet to the first PDCP entity. That is, when a plurality of PDCP entities correspond to a same DRB ID, data packets received by the plurality of PDCP entities converge into one PDCP entity, and the PDCP entity performs redundancy removal and/or reordering processing on the data packets.

Figure 13A:
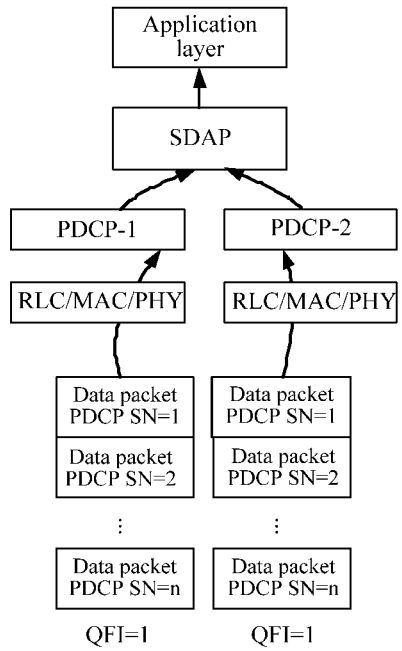
FIG. 13A is a schematic diagram 1 of a second manner in which a terminal device performs duplication and transmission processing on a data packet in data flow(s) according to an embodiment of the present invention.
Figure 13B:
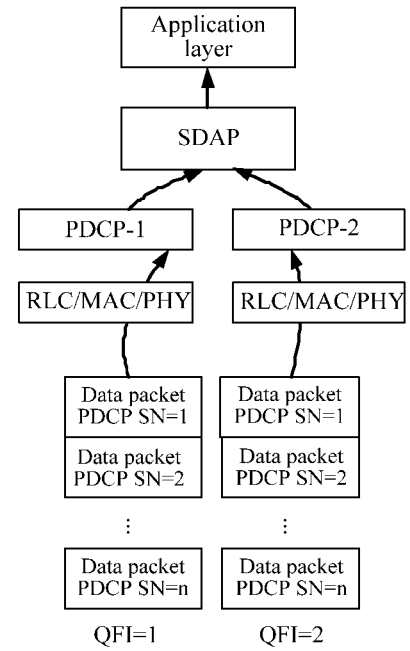
FIG. 13B is a schematic diagram 2 of a second manner in which a terminal device performs duplication and transmission processing on a data packet in data flow(s) according to an embodiment of the present invention.

Using an example in which the electronic device is a terminal device, a second manner in which the terminal device performs duplication and transmission processing on a data packet in the data flow(s) includes: performing, by an SDAP entity of the terminal device, duplication and transmission processing on a received data packet based on an SN of a data packet in an SDAP layer. For data for downlink transmission, after processing the received data packets, the first PDCP entity and the second PDCP entity send the data packets to the SDAP entity. The SDAP entity performs redundancy removal and/or reordering on the received data packets based on SNs, and then sends the data packets to an application layer. FIG. 13A is a schematic diagram 1 of the second manner in which the terminal device performs duplication and transmission processing on a data packet in the data flow(s). As shown in FIG. 13A, a QFI of data flow(s) corresponding to a data packet sent by a first PDCP entity is the same as that of data flow(s) corresponding to a data packet sent by a second PDCP entity. FIG. 13B is a schematic diagram 2 of the second manner in which the terminal device performs duplication and transmission processing on a data packet in the data flow(s). As shown in FIG. 13B, a QFI of data flow(s) corresponding to a data packet sent by a first PDCP entity is different from that of data flow(s) corresponding to a data packet sent by a second PDCP entity. For data for uplink transmission, after receiving a data packet sent from an application layer, an SDAP entity performs redundancy addition processing on the data packet based on an SN. Optionally, the redundancy addition processing refers to duplicating a data packet in the data flow(s), and/or adding a same SN for a same data packet. During specific implementation, the redundancy addition processing is that when duplicating the data packet, the SDAP entity may add a same SN for a same data packet in a layer other than an SDAP layer, for example, an application layer over the SDAP layer. Then, the SDAP entity sends the duplicated data packet to the first PDCP entity and the second PDCP entity. The first PDCP entity and the second PDCP entity respectively send the data packet to underlying entities corresponding to the first PDCP entity and the second PDCP entity. In this embodiment of the present invention, one PDCP entity does not need to serve only one data flow, and an SN is added in a data packet on a transmit end (such as a UPF entity).

Figure 14A:
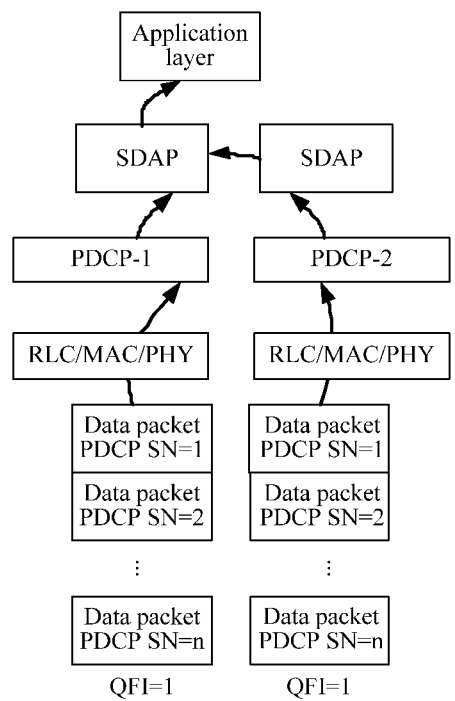
FIG. 14A is a schematic diagram 1 of a third manner in which a terminal device performs duplication and transmission processing on a data packet in data flow(s) according to an embodiment of the present invention.
Figure 14B:
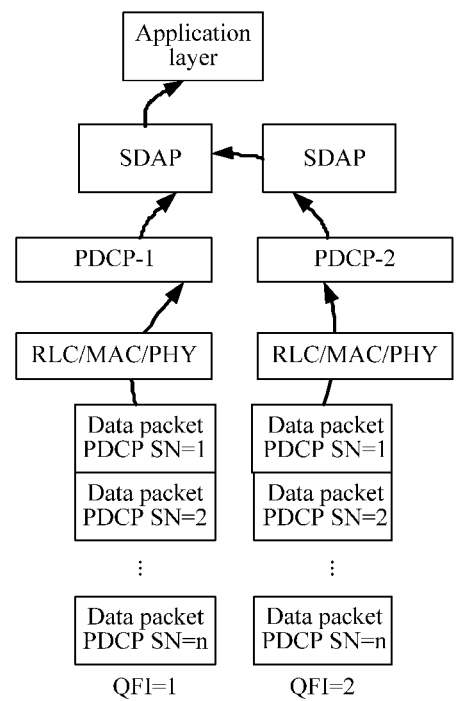
FIG. 14B is a schematic diagram 2 of a third manner in which a terminal device performs duplication and transmission processing on a data packet in data flow(s) according to an embodiment of the present invention.

Using an example in which the electronic device is a terminal device, a third manner in which the terminal device performs duplication and transmission processing on a data packet in the data flow(s) includes: respectively receiving, by a first SDAP entity and a second SDAP entity of the terminal device, a first data packet and a second data packet, wherein the first data packet and the second data packet may belong to different sessions; sending, by the second SDAP entity, the second data packet to the first SDAP entity; and performing, by the first SDAP entity, duplication and transmission processing on a data packet based on an SN. For data for downlink transmission, the first SDAP entity receives the first data packet sent by the first PDCP entity, and the second SDAP entity receives the second data packet sent by the second PDCP entity. The first SDAP entity sends the received data packet to the second entity. The second SDAP entity performs redundancy removal and/or reordering on the data packets based on the SNs, and then sends the data packets to an application layer. FIG. 14A is a schematic diagram 1 of the third manner in which the terminal device performs duplication and transmission processing on a data packet in the data flow(s). As shown in FIG. 14A, a QFI of data flow(s) corresponding to a data packet sent by a first PDCP entity is the same as that of data flow(s) corresponding to a data packet sent by a second PDCP entity. FIG. 14B is a schematic diagram 2 of the third manner in which the terminal device performs duplication and transmission processing on a data packet in the data flow(s). As shown in FIG. 14B, a QFI of data flow(s) corresponding to a data packet sent by a first PDCP entity is different from that of data flow(s) corresponding to a data packet sent by a second PDCP entity. For data for uplink transmission, after receiving a data packet sent from an application layer, a first SDAP entity performs redundancy addition processing. Optionally, the redundancy addition processing refers to duplicating a data packet in the data flow(s), and/or adding a same SN for a same data packet. During specific implementation, the redundancy addition processing is that when duplicating a data packet, the first SDAP entity may add a same SN for a same data packet in a layer other than an SDAP layer, for example, an application layer over the SDAP layer. Then, the first SDAP entity sends the duplicated data packet to a second SDAP entity. The first SDAP entity and the second SDAP entity respectively send the received data packets to the first PDCP entity and the second PDCP entity.

Figure 15:
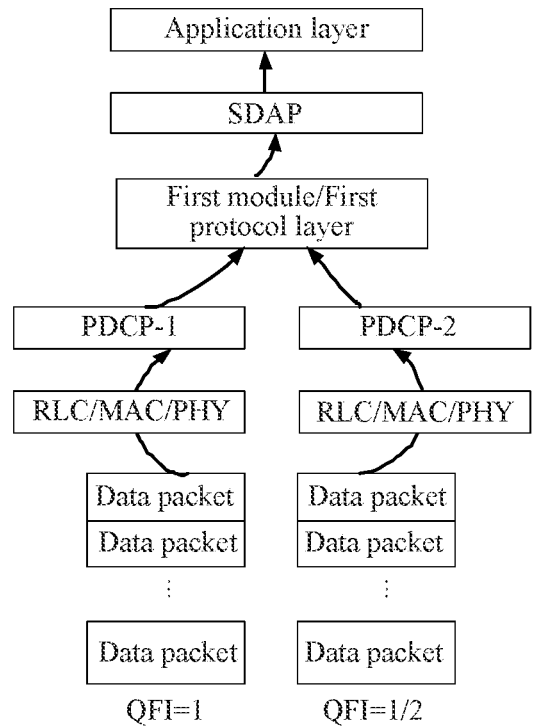
FIG. 15 is a schematic diagram 1 of a fourth manner in which a terminal device performs duplication and transmission processing on a data packet in data flow(s) according to an embodiment of the present invention.
Figure 16:
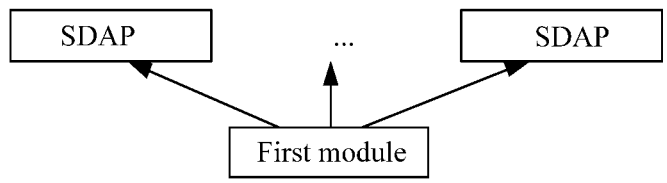
FIG. 16 is a schematic diagram showing a correspondence between a first module and an SDAP entity according to an embodiment of the present invention.

The electronic device being a terminal device is used as an example. FIG. 15 is a schematic diagram 1 of a fourth manner in which the terminal device performs duplication and transmission processing on a data packet in the data flow(s), including: performing, by a first module between a PDCP layer and the SDAP layer, duplication and transmission processing on a data packet based on an SN of a data packet in the PDCP layer. Herein, the first module is a newly added module between the PDCP layer and the SDAP layer. The first module may be an independent hardware module. The first module may alternatively belong to a first protocol layer entity corresponding to a newly added first protocol layer between the PDCP layer and the SDAP layer. During specific implementation, an implementation is that: one or more PDCP entities send specific data for redundant transmission to the first module, and the first module performs redundant transmission processing on a data packet according to an SN of a data packet in the PDCP layer. Another implementation is that: one or more PDCP entities send specific data for redundant transmission to the first module, and the first module performs redundant transmission processing on a data packet according to an SN of a data packet in the SDAP layer. For data for downlink transmission, after performing redundancy removal/reordering on a data packet sent by the PDCP entity, the first module sends the data packet to the SDAP layer. For data for uplink transmission, the first module performs redundancy addition processing on a data packet sent by the SDAP entity. Optionally, the redundancy addition processing refers to duplicating a data packet in the data flow(s), and/or adding a same SN for a same data packet. During specific implementation, the redundancy addition processing is that when duplicating a data packet, the first module may add a same SN for a same data packet in a layer other than a first protocol layer, for example, an application layer over the first protocol layer. Then, the first module sends the duplicated data packet to the PDCP layer. The first module may serve one session or more sessions. That is, one first module corresponds to one SDAP entity, or as shown in FIG. 16, one first module corresponds to two or more SDAP entities.

Figure 17:
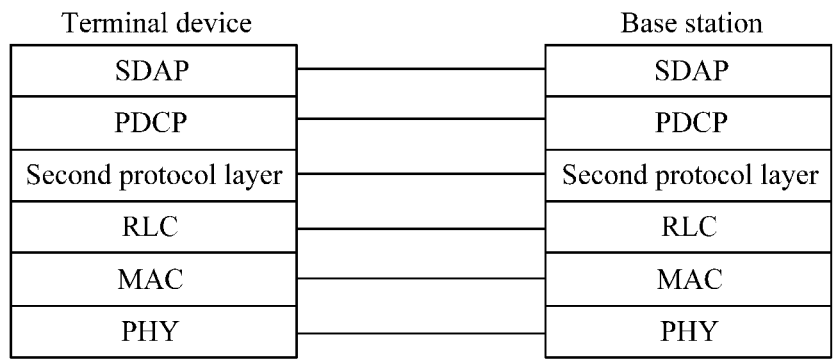
FIG. 17 is a schematic diagram 2 of a fourth manner in which a terminal device performs duplication and transmission processing on a data packet in data flow(s) according to an embodiment of the present invention.

The electronic device being a terminal device is used as an example. FIG. 17 is a schematic diagram 2 of the fourth manner in which the terminal device performs duplication and transmission processing on a data packet in the data flow(s), including: performing, by the second protocol layer entity, duplication and transmission processing on a data packet based on an SN of a data packet in a second protocol layer. The second protocol layer corresponding to the second protocol layer entity is located between a PDCP layer and an RLC layer. The second protocol layer is a newly added protocol layer between the PDCP layer and the RLC layer.

Figure 18:
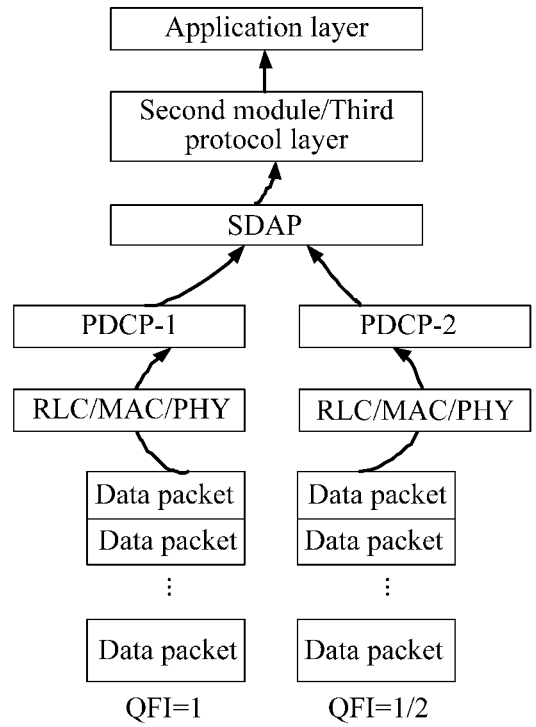
FIG. 18 is a schematic diagram 1 of a fifth manner in which a terminal device performs duplication and transmission processing on a data packet in data flow(s) according to an embodiment of the present invention.
Figure 19:
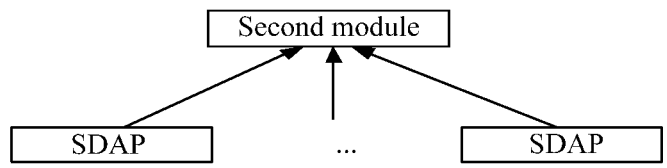
FIG. 19 is a schematic diagram showing a correspondence between a second module and an SDAP entity according to an embodiment of the present invention.

The electronic device being a terminal device is used as an example. FIG. 18 is a schematic diagram 1 of a fifth manner in which the terminal device performs duplication and transmission processing on a data packet in the data flow(s), including: performing, by a second module between an SDAP layer and an application layer of the terminal device, duplication and transmission processing on a data packet based on an SN of a data packet in the SDAP layer. Herein, the second module is a newly added module between the application layer and the SDAP layer. The second module may be an independent hardware module. The second module may alternatively belong to a third protocol layer entity corresponding to a newly added third protocol layer between the application layer and the SDAP layer. For data for downlink transmission, after performing, according to an SN of a data packet in the SDAP layer, redundancy removal/reordering on a data packet sent by an SDAP entity, the second module sends the data packet to the application layer. For data for uplink transmission, the second module performs redundancy addition processing on a data packet sent by an application layer entity. Optionally, the redundancy addition processing refers to duplicating a data packet in the data flow(s), and/or adding a same SN for a same data packet. During specific implementation, the redundancy addition processing is that when duplicating a data packet, the second module may add a same SN for a same data packet in a layer other than the third protocol layer, for example, an application layer over the third protocol layer. Then, the second module sends the duplicated data packet to the SDAP layer. The second module may serve one session or more sessions. That is, one second module corresponds to one SDAP entity, or as shown in FIG. 19, one second module corresponds to two or more SDAP entities.

Figure 20:
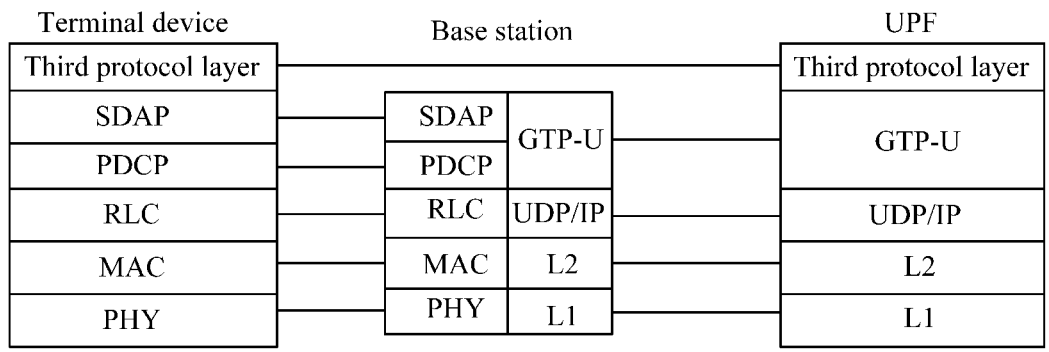
FIG. 20 is a schematic diagram 2 of a fifth manner in which a terminal device performs duplication and transmission processing on a data packet in data flow(s) according to an embodiment of the present invention.

The electronic device being a terminal device is used as an example. FIG. 20 is a schematic diagram 2 of the fifth manner in which the terminal device performs duplication and transmission processing on a data packet in the data flow(s), including: performing, by a third protocol layer entity, duplication and transmission processing on a data packet based on an SN of a data packet in a third protocol layer. The third protocol layer corresponding to the third protocol layer entity is located between an SDAP layer and an application layer. The first protocol layer may further include a QFI. During implementation of this embodiment of the present invention, a third protocol layer is also correspondingly added to a UPF on a core network side. A data packet is transparently transmitted to the UPF through an access network device, and the UPF performs redundancy processing on the data packet based on an SN, or based on an SN and a QFI. Different data flows may have a same QFI or different QFIs. For data for downlink transmission, a newly added third protocol layer entity of the UPF performs redundancy addition processing on a data packet based on an SN of a data packet in the third protocol layer, and then transparently transmits the data packets to the terminal device through the access network device. The third protocol layer entity of the terminal device performs redundancy removal and/or reordering processing on the data packet based on the SN of the data packet in the third protocol layer. For data for uplink transmission, a newly added third protocol layer entity of the terminal device performs redundancy addition processing on a data packet based on an SN of a data packet in the third protocol layer, and then transparently transmits the data packet to the UPF through the access network device. The third protocol layer entity of the UPF performs redundancy removal and/or reordering processing on the data packet based on the SN of the data packet in the third protocol layer.

Figure 21A:
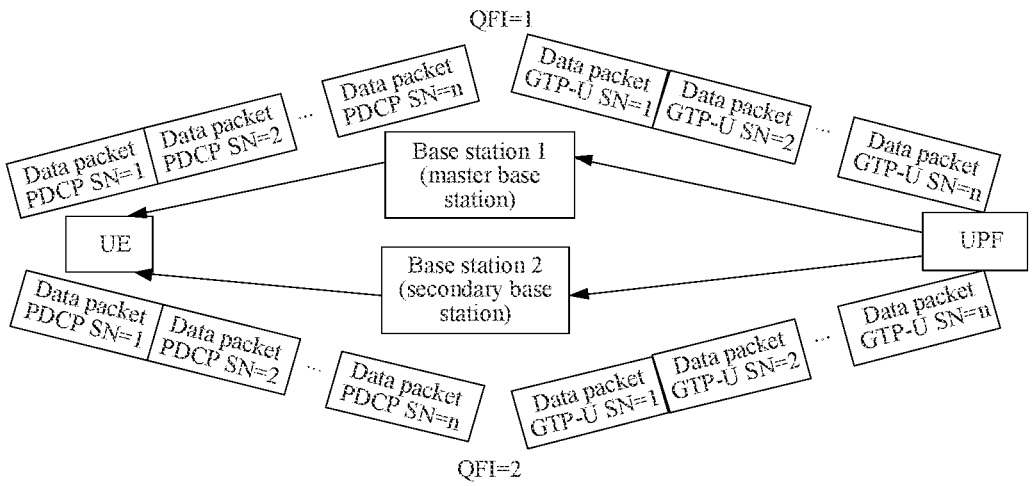
FIG. 21A is a schematic diagram 1 showing that a base station performs duplication and transmission processing on a data packet in data flow(s) according to an embodiment of the present invention.
Figure 21B:
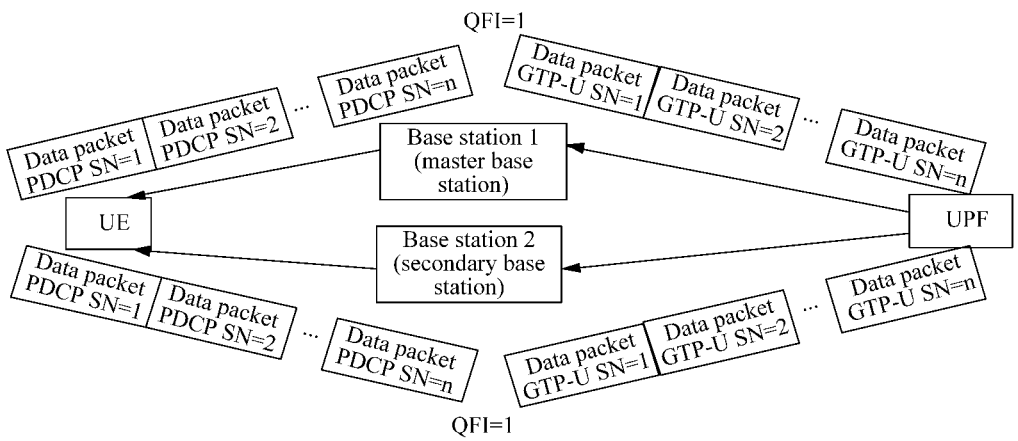
FIG. 21B is a schematic diagram 2 showing that a base station performs duplication and transmission processing on a data packet in data flow(s) according to an embodiment of the present invention.

In some other embodiments, the electronic device being a base station is used as an example. For data for downlink transmission, a manner in which a base station performs duplication and transmission processing on a data packet in the data flow(s) includes: adding, by the base station, a same SN for a same data packet; and sending, by the base station, a data packet added with an SN. During specific implementation, for data for downlink transmission, a PDCP entity of the base station adds a same SN for a same data packet; or an SDAP entity of the base station adds a same SN for a same data packet; or a first protocol layer entity corresponding to a first protocol layer between a PDCP layer and an SDAP layer of the base station adds a same SN for a same data packet; or a second protocol layer entity corresponding to a second protocol layer between a PDCP layer and an RLC layer of the base station adds a same SN for a same data packet; or a third protocol layer entity corresponding to a third protocol layer between an SDAP layer and an application layer of the base station adds a same SN for a same data packet. FIG. 21A is a schematic diagram 1 showing that a base station performs duplication and transmission processing on a data packet in the data flow(s). As shown in FIG. 21A, two data flows received by the base station have different QFIs. FIG. 21B is a schematic diagram 2 showing that a base station performs duplication and transmission processing on a data packet in the data flow(s). As shown in FIG. 21B, two data flows received by the base station have a same FQI. For data for uplink transmission, after receiving a data packet sent by an SDAP entity, a first PDCP entity performs redundancy addition processing on the data packet based on an SN, that is, duplicates the data packet, adds a same SN for a same data packet, and then sends the duplicated data packet added with the SN to a second PDCP entity. The first PDCP entity and the second PDCP entity respectively send the data packets to underlying entities corresponding to the first PDCP entity and the second PDCP entity. For data for uplink transmission, the base station converts an SN of a data packet in a PDCP layer, an SN of a data packet in an SDAP layer, an SN of a data packet in a first protocol layer between the PDCP layer and the SDAP layer, an SN of a data packet in a second protocol layer between the PDCP layer and an RLC layer, or an SN of a data packet in a third protocol layer between the SDAP layer and an application layer into an SN of a data packet in a GTP-U layer. The base station sends the data flow(s) and the converted the SN of the data packet in the GTP-U layer to the UPF entity.

In some other embodiments, the electronic device being a core network device (such as a UPF) is used as an example. For data for uplink transmission, the UPF entity performs redundancy removal and/or reordering processing on a data packet according to an SN of a data packet in a GTP-U layer and/or a QFI. For data for downlink transmission, a fourth protocol layer entity of the UPF entity performs redundancy addition processing on a data packet according to an SN of a data packet in a fourth protocol layer and/or a QFI, that is, duplicates the data packet, adds a same SN for a same data packet, and then sends the duplicated data packet added with the SN. The fourth protocol layer corresponding to the fourth protocol layer entity is located over the GTP-U layer. In this case, the first information is sent by a terminal device, and the first information indicates a protocol layer of the terminal device supporting redundant transmission, for example, an SDAP layer or a PDCP layer, or a newly added protocol layer.

Figure 22:
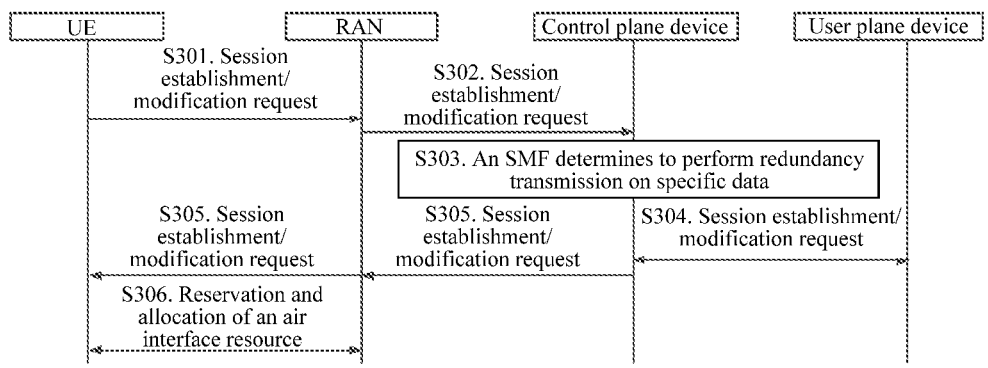
FIG. 22 is a schematic processing flowchart of establishing a session according to an embodiment of the present invention.

As shown in FIG. 22, an optional schematic processing flowchart of establishing a session according to an embodiment of the present invention includes the following steps:

Step S301. A terminal device sends a PDU session establishment request message/modification request message to an access network device.

The PDU session establishment request message/modification request message carries a first identifier. The first identifier is used to indicate whether redundant transmission of data in a PDCP layer or an SDAP layer is supported. Optionally, the first identifier is an NAS message.

Step S302. The access network device transmits the PDU session establishment request message/modification request message to a core network control plane device.

Step S303. The core network control plane device determines to perform redundant transmission on specific data.

Optionally, the specific data is a data packet corresponding to data flow(s) having a specific QFI.

Step S304. The core network control plane device transmits the PDU session establishment request message/modification request message to a core network user plane device.

Step S305. The core network user plane device sends a transmission manner of data flow(s) to a base station or the terminal device.

During specific implementation, the core network user plane device may add all related information of the transmission manner of the data flow(s) to first information, and sends the first information to the base station or the terminal device based on the NAS message. The core network user plane device may alternatively add a part of information of the transmission manner of the data flow(s) to first information, and sends the first information to the terminal device or the base station based on the NAS message. Another part of information of the transmission manner of the data flow(s) is carried in a second indication, and is sent to the terminal device or the base station through an N2 message.

Step S306. The terminal device interacts with the base station, to reserve and allocate an air interface resource.

Figure 23:
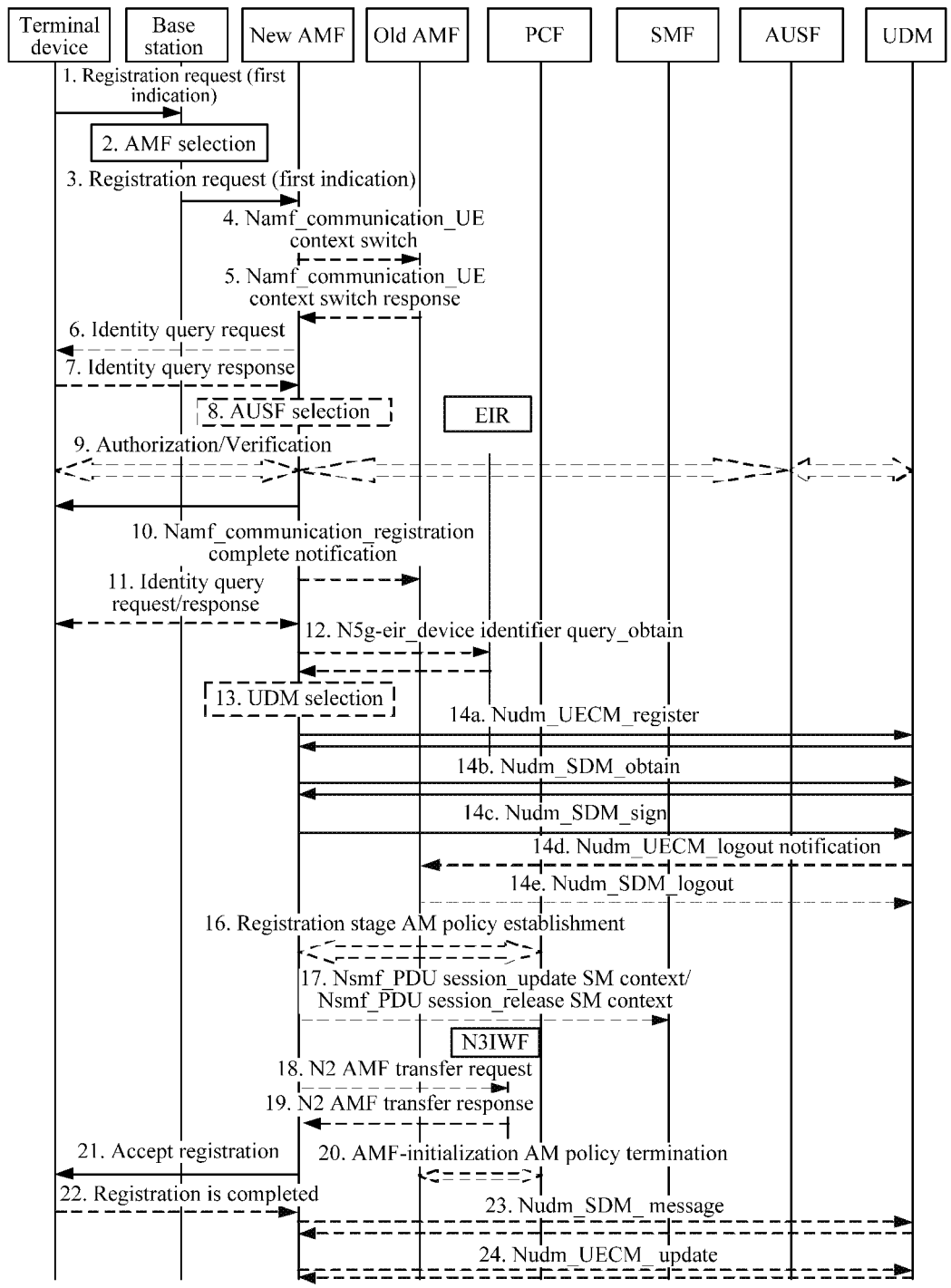
FIG. 23 is a schematic processing flowchart of registration according to an embodiment of the present invention.

Based on the data flow processing method provided by the embodiments of the present invention, a schematic processing flowchart of registration is shown in FIG. 23. When sending a registration request to an access network device, a terminal device adds a first indication, and the access network device transparently transmits the first indication to a new AMF. The first indication is used to indicate whether redundant transmission of data in a PDCP layer or an SDAP layer is supported.

Figure 24:
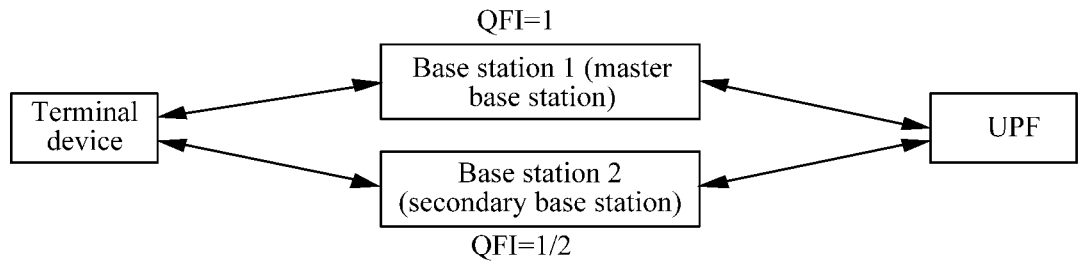
FIG. 24 is a schematic processing flowchart showing that a master base station and a secondary base station in dual-connectivity transmit a same data packet according to an embodiment of the present invention.
Figure 25:
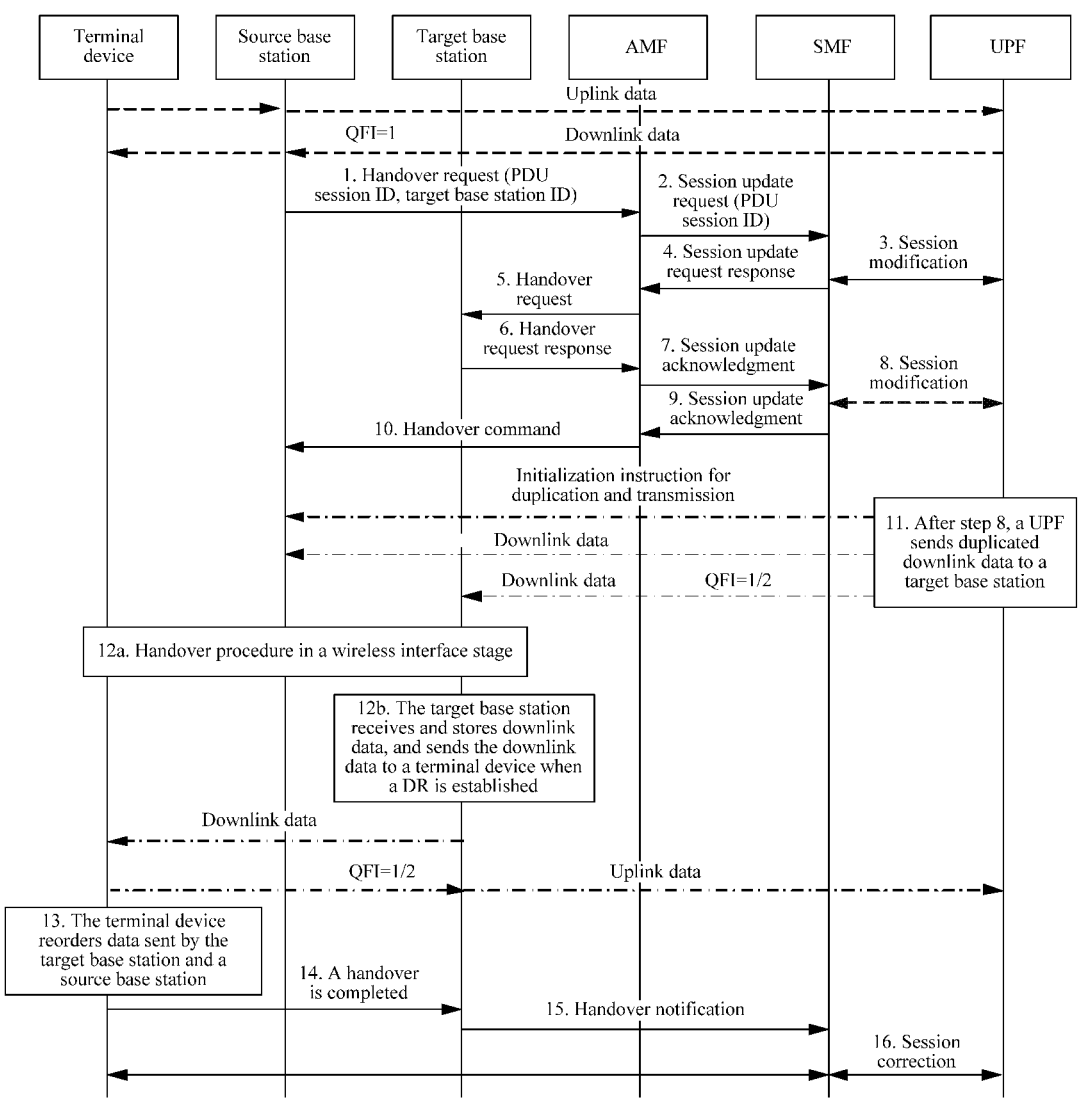
FIG. 25 is a schematic diagram showing that a UPF performs redundant transmission on a same data packet of a source base station and a target base station.

Based on the data flow processing method provided in the embodiments of the present invention, as shown in FIG. 24, a master base station and secondary base station in dual-connectivity can transmit same data packets. The transmitted data packets may have a same QFI or different QFIs. A handover processing procedure shown in FIG. 25 is the same as the handover processing procedure shown in FIG. 5. A UPF performs redundant transmission on same data packets of a source base station and a target base station. A difference is in that: during the handover process in FIG. 25, transmission is performed on two transmission paths by using a same QFI or different QFIs. As shown in FIG. 25, dashed lines are data flows whose QFI=1, and dash-dotted lines are data flows whose QFI=1 or QFI=2. The data flows include a data packet for uplink transmission and a data packet for downlink transmission.

Figure 26:
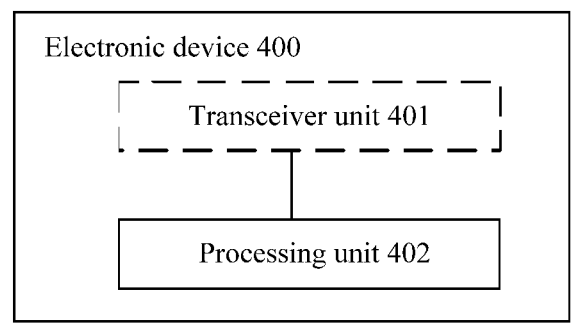
FIG. 26 is a schematic composition structural diagram of an electronic device according to an embodiment of the present invention.

Based on the aforesaid data flow processing method in the embodiments of the present invention, an embodiment of the present invention further provides an electronic device. As shown in FIG. 26, a composition structure of an electronic device 400 includes a processing unit 402.

The processing unit 402 is configured to process data flow(s) based on first information, where the first information is used to indicate a transmission manner of the data flow(s).

In this embodiment of the present invention, the first information may be received by the electronic device 400. Alternatively, the first information is pre-configured. When the first information is received by the electronic device 400, the electronic device 400 further includes a transceiver unit 401, configured to receive the first information.

In this embodiment of the present invention, the transmission manner of the data flow(s) includes: performing, by the processing unit 402, duplication and transmission processing on a data packet in the data flow(s). Optionally, the transmission manner of the data flow(s) includes: transmitting data flow(s) having a first QFI based on at least two paths; or transmitting a same data packet through data flows having different QFIs.

In this embodiment of the present invention, when different data flows belong to different sessions, the first information is further used to indicate a session ID to which each data flow belongs.

In this embodiment of the present invention, the transmission manner of the data flow(s) includes: performing redundant transmission on the data flow(s) based on a core network tunnel; and/or preforming redundant transmission on the data flow(s) based on an air interface connection.

In some embodiments, when the electronic device is a terminal device, a second PDCP entity of the processing unit 402 sends a data packet having an SN to a first PDCP entity of the processing unit. The first PDCP entity performs duplication and transmission processing on the received data packet based on the SN.

Optionally, the first information is used to instruct the second PDCP entity to send a data packet to the first PDCP entity.

Optionally, the first information is used to instruct the second PDCP entity to send a data packet corresponding to a second QFI to the first PDCP entity; and/or the first information is used to instruct the second PDCP entity to send a data packet corresponding to a third QFI having a mapping relationship with the second QFI to the first PDCP entity.

Optionally, the first information is used to instruct the second PDCP entity corresponding to a first DRB ID to send the data packet to the first PDCP entity.

Optionally, both the first PDCP entity and the second PDCP entity only transmit data flow(s) corresponding to one QFI.

Optionally, each data flow has an independent SN.

Optionally, data flow(s) that are duplicated and transmitted are mapped to a same DRB ID.

In this embodiment of the present invention, an SDAP entity of the processing unit 402 performs duplication and transmission processing on a received data packet based on an SN of a data packet in an SDAP layer.

In this embodiment of the present invention, a first SDAP entity and a second SDAP entity of the processing unit 402 respectively receive a first data packet and a second data packet. The first data packet and the second data packet belong to different sessions. The second SDAP entity sends the second data packet to the first SDAP entity. The first SDAP entity performs duplication and transmission processing on data packets based on SNs.

In this embodiment of the present invention, a first module of the processing unit 402 performs duplication and transmission processing on a data packet based on an SN of a data packet in a PDCP layer. The first module is located between the PDCP layer and an SDAP layer of the electronic device.

In this embodiment of the present invention, a first module of the processing unit 402 performs duplication and transmission processing on a data packet based on an SN of a data packet in an SDAP layer. The first module is located between a PDCP layer and the SDAP layer of the electronic device.

In this embodiment of the present invention, a second protocol layer entity of the processing unit 402 performs duplication and transmission processing on a data packet based on an SN of a data packet in a second protocol layer. The second protocol layer corresponding to the second protocol layer entity is located between a PDCP layer and an RLC layer of the electronic device.

In this embodiment of the present invention, a second module of the processing unit 402 performs duplication and transmission processing on a data packet based on an SN of a data packet in an SDAP layer. The second module is located between the SDAP layer and an application layer of the electronic device.

In this embodiment of the present invention, a third protocol layer entity of the processing unit 402 performs duplication and transmission processing on a data packet based on an SN of a data packet in third protocol layer. The third protocol layer corresponding to the third protocol layer entity is located between an SDAP layer and an application layer of the electronic device.

In the embodiments of the present invention, the data packet includes: a data packet for downlink transmission and/or a data packet for uplink transmission.

In some other embodiments, when the electronic device is abase station, the processing unit 402 is configured to: add an SN for a data packet; and send the data packet added with the SN.

Optionally, a first protocol layer entity of the processing unit 402 adds an SN for a data packet, where a first protocol layer corresponding to the first protocol layer entity is located between a PDP layer and an SDAP layer of the electronic device; or a second protocol layer entity of the processing unit adds an SN for a data packet, where a second protocol layer corresponding to the second protocol layer entity is located between a PDP layer and an RLC layer of the electronic device; or a third protocol layer entity of the processing unit adds an SN for a data packet, where a third protocol layer corresponding to the third protocol layer entity is located between an SDAP layer and an application layer of the electronic device.

Optionally, the processing unit 402 is configured to: convert an SN of a data packet in a PDCP layer, an SN of a data packet in an SDAP layer, an SN of a data packet in a first protocol layer between the PDCP layer and the SDAP layer, an SN of a data packet in a second protocol layer between the PDCP layer and an RLC layer, or an SN of a data packet in a third protocol layer between the SDAP layer and an application layer into an SN of a data packet in a GTP-U layer; and send the data flow(s) and the converted SN of the data packet in the GTP-U layer to a UPF entity.

In some other embodiments, when the electronic device is a UPF entity, the processing unit 402 is configured to perform redundancy removal and/or reordering processing on a data packet according to an SN of a data packet in a GTP-U layer and/or a QFI.

Optionally, a fourth protocol layer entity of the processing unit 402 performs redundancy addition processing on a data packet according to an SN of a data packet in a fourth protocol layer and/or a QFI. The fourth protocol layer corresponding to the fourth protocol layer entity is located over the GTP-U layer.

In the embodiments of the present invention, the duplication and transmission processing includes at least one of the following: redundancy addition processing; and redundancy removal and/or reordering. Data flow(s) that are duplicated and transmitted have a same QFI or have different QFIs.

An embodiment of the present invention further provides a terminal device, including a processor and a memory configured to store a computer program executable on the processor, where the processor is configured to, when running the computer program, perform steps of the data flow processing method performed by the aforesaid terminal device.

An embodiment of the present invention further provides a base station, including a processor and a memory configured to store a computer program executable on the processor, where the processor is configured to, when running the computer program, perform steps of the data flow processing method performed by the aforesaid base station.

An embodiment of the present invention further provides a UPF entity, including a processor and a memory configured to store a computer program executable on the processor, where the processor is configured to, when running the computer program, perform steps of the data flow processing method performed by the aforesaid UPF entity.

It should be noted that, the data flow processing method provided in the embodiments of the present invention, and the electronic device for implementing the data flow processing method provided in the embodiments of the present invention are not only applicable to a handover between intra-system cells, but also applicable to a scenario such as a handover between inter-system cells or LTE/WALN redundant transmission.

Figure 27:
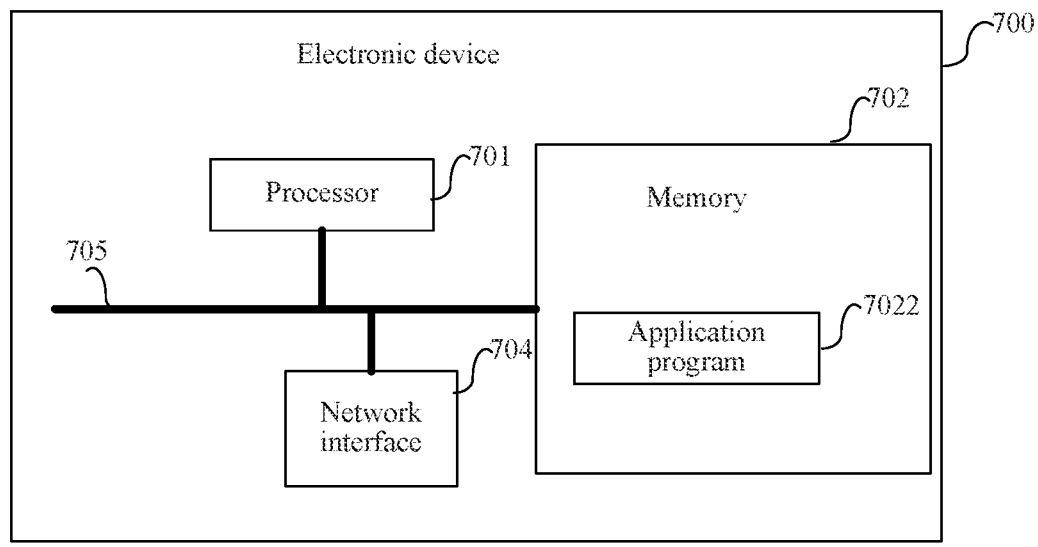
FIG. 27 is a schematic composition structural diagram of hardware of an electronic device according to an embodiment of the present invention.

FIG. 27 is a schematic composition structural diagram of hardware of an electronic device (a terminal device, a base station, or a UPF entity) according to an embodiment of the present invention. An electronic device 700 includes: at least one processor 701, a memory 702, and at least one network interface 704. All the components in the electronic device 700 are coupled together by using a bus system 705. It may be understood that, the bus system 705 is configured to implement connection and communication between the components. In addition to a data bus, the bus system 705 further includes a power bus, a control bus, and a state signal bus. However, for ease of clear description, all types of buses in FIG. 6 are marked as the bus system 705.

It may be understood that, the memory 702 may be a volatile memory or a non-volatile memory, or may include both a volatile memory and a non-volatile memory. The non-volatile memory may be a ROM, a programmable Read-Only Memory (PROM), an erasable programmable read-only memory (EPROM), an electrically erasable programmable read-only memory (EEPROM), a ferromagnetic random access memory (FRAM), a flash memory, a magnetic surface memory, an optical disc, or compact disc read-only memory (CD-ROM). The magnetic surface memory may be a magnetic disk memory or a magnetic tape memory. The volatile memory may be a random access memory (RAM), used as an external cache. Through exemplary but non-limitative descriptions, RAMs in lots of forms may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a direct Rambus random access memory (DRRAM). The memory 702 in this embodiment of the present invention is intended to include, but is not limited to, the memories and any other memory of a suitable type.

The memory 702 in this embodiment of the present invention is configured to store various types of data to support operation of the electronic device 700. Examples of the types of data include any computer program to be operated on the electronic device 700, for example, an application program 7022. A program for implementing the method in the embodiments of the present invention may be included in the application program 7022.

The method disclosed in the aforesaid embodiment of the present invention may be applied to the processor 701, or implemented by the processor 701. The processor 701 may be an integrated circuit chip, having a capability of processing a signal. In an implementation process, steps in the aforesaid methods can be implemented by using a hardware integrated logical circuit in the processor 701, or by using instructions in a form of software. The processor 701 may be a general-purpose processor, a digital signal processor (DSP), another programmable logic device, discrete gate or transistor logic device, or discrete hardware assembly, or the like. The processor 701 can implement or perform the methods, steps, and logic block diagrams disclosed in the embodiments of the present invention. The general purpose processor may be a microprocessor or any conventional processor, or the like. The steps in the methods disclosed in the embodiments of the present invention may be directly implemented by a hardware decoding processor, or may be implemented by combining hardware and software modules in a decoding processor. The software module may be located in the storage medium. The storage medium is located in the memory 702. The processor 701 reads information in the memory 702, and completes steps of the aforesaid method in combination with hardware thereof.

In an exemplary embodiment, the electronic device 700 may be implemented by using one or more application specific integrated circuits (ASICs), DSPs, programmable logic devices (PLDs), complex programmable logic devices (CPLDs), FPGAs, general-purpose processors, controllers, MCUs, or MPUs, or other electronic components, to perform the aforesaid methods.

The embodiments of this application further provide a computer-readable storage medium, configured to store a computer program.

Optionally, the computer-readable storage medium may be applied to the base station in the embodiments of this application, and the computer storage medium causes the computer to perform corresponding procedures implemented by the base station in various methods in the embodiments of this application. For brevity, details are not described herein again.

Optionally, the computer-readable storage medium may be applied to the terminal device in the embodiments of this application, and the computer storage medium causes the computer to perform corresponding procedures implemented by the terminal device in various methods in the embodiments of this application. For brevity, details are not described herein again.

Optionally, the computer-readable storage medium may be applied to the UPF entity in the embodiments of this application, and the computer storage medium causes the computer to perform corresponding procedures implemented by the UPF entity in various methods in the embodiments of this application. For brevity, details are not described herein again.

The present disclosure is described with reference to flowcharts and/or block diagrams of the method, device (system), and computer program product in the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable devices, thereby generating computer-implemented processing. Therefore, the instructions executed on the computer or the another programmable device provide steps for implementing a specific function in one or more processes in the flowcharts and/or in one or more blocks in the block diagrams.

The aforesaid descriptions are merely preferred embodiments of the present invention, but are not intended to limit the protection scope of the present invention. Any modification, equivalent replacement, or improvement made within the spirit and principle of the present invention shall fall within the protection scope of the present invention.

What is claimed is:

1. A data flow processing method, comprising:
   receiving, by an electronic device from a Session Management Function (SMF), first information used to indicate a duplication transmission manner of one or more Quality of Service (QoS) flows;
   performing, by the electronic device, a duplication transmission of the one or more QoS flows based on the duplication transmission manner indicated by the first information, wherein the duplication transmission manner of the one or more QoS flows comprises transmitting the one or more QoS flows having a first QoS flow identifier (QFI) based on at least two paths, and wherein the one or more QoS flows correspond to a same Protocol Data Unit (PDU) session;
   wherein the duplication transmission manner of the one or more QoS flows comprises:
   a manner of performing, by the electronic device, duplication and transmission processing on a data packet in the one or more QoS flows;
   wherein when the electronic device is a User Equipment (UE), the manner of performing, by the electronic device, duplication and transmission processing on the data packet in the one or more QoS flows comprises:
   sending, by a second Packet Data Convergence Protocol (PDCP) entity of the electronic device, a data packet having a serial number (SN) to a first PDCP entity of the electronic device; and
   performing, by the first PDCP entity, duplication and transmission processing on the received data packet based on the SN;
   wherein the first information is used to indicate the second PDCP entity to send a data packet corresponding to a third QFI having a mapping relationship with a second QFI to the first PDCP entity.

2. The method according to claim 1, wherein the manner of performing duplication and transmission processing on the data packet comprises performing redundant transmission of the data packet using a core network tunnel.

3. The method according to claim 1, wherein the duplication transmission manner of the one or more QoS flows comprises at least one of:
   duplicating the same data packet with the same SN; or
   encapsulating the SN in GTP-U layer, PDCP layer, or SDAP layer.

4. The method according to claim 1, wherein the duplication transmission manner of the one or more QoS flows comprises:
   duplicating, by the electronic device, one or more data packets; and
   assigning, by the electronic device, identifiers to the one or more data packets, wherein a receiving device that receives the one or more data packets is configured to deduplicate the one or more data packets using at least one of:
   a flow identifier; or
   an SN.

5. The method according to claim 1, wherein the duplication transmission manner of the one or more QoS flows comprises at least one of:
   performing redundant transmission on the one or more QoS flows based on a core network tunnel; or
   performing redundant transmission on the one or more QoS flows based on an air interface connection.

6. An apparatus for processing a data flow, the apparatus comprising:
   a communication interface;
   a memory configured to store computer-executable instructions; and
   one or more processors in communication with the communication interface and the memory and configured to execute the computer-executable instructions to at least:
   receive, from a Session Management Function (SMF), first information used to indicate a duplication transmission manner of the one or more Quality of Service (QoS) flows,
   perform a duplication transmission of the one or more QoS flows based on the duplication transmission manner indicated by the first information, wherein the duplication transmission manner of the one or more QoS flows comprises transmitting the one or more QoS flows having a first QoS flow identifier (QFI) based on at least two paths, and wherein the one or more QoS flows correspond to a same Protocol Data Unit (PDU) session;
   wherein the duplication transmission manner of the one or more QoS flows comprises:
   a manner of performing duplication and transmission processing on a data packet in the one or more QoS flows;

wherein when the apparatus is a User Equipment (UE), the manner of performing duplication and transmission processing on the data packet in the one or more QoS flows comprises:
sending, by a second Packet Data Convergence Protocol (PDCP) entity of the apparatus, a data packet having a serial number (SN) to a first PDCP entity of the apparatus; and
performing, by the first PDCP entity, duplication and transmission processing on the received data packet based on the SN;
wherein the first information is used to indicate the second PDCP entity to send a data packet corresponding to a third QFI having a mapping relationship with a second QFI to the first PDCP entity.

7. The apparatus of claim 6, wherein the manner of performing duplication and transmission processing on the data packet comprises performing redundant transmission of the data packet using a core network tunnel.

8. The apparatus of claim 6, wherein the duplication transmission manner of the one or more QoS flows comprises at least one of:
duplicating the same data packet with the same SN; or
encapsulating the SN in GTP-U layer, PDCP layer, or SDAP layer.

9. The apparatus of claim 6, wherein the duplication transmission manner of the one or more QoS flows comprises:
duplicating one or more data packets; and
assigning identifiers to the one or more data packets, wherein a receiving device that receives the one or more data packets is configured to deduplicate the one or more data packets using at least one of:
a flow identifier; or
an SN.

10. The apparatus of claim 6, wherein the duplication transmission manner of the one or more QoS flows comprises at least one of:
performing redundant transmission on the one or more QoS flows based on a core network tunnel; or
performing redundant transmission on the one or more QoS flows based on an air interface connection.

11. A non-transitory computer-readable storage medium storing computer-executable instructions that, when executed by a computer system, configure the computer system to perform operations comprising:
receiving, by an electronic device from a Session Management Function (SMF), first information used to indicate a duplication transmission manner of one or more Quality of Service (QoS) flows,
performing, by the electronic device, a duplication transmission of the one or more QoS flows based on the duplication transmission manner indicated by the first information, wherein the duplication transmission manner of the one or more QoS flows comprises transmitting the one or more QoS flows having a first QoS flow identifier (QFI) based on at least two paths, and wherein the one or more QoS flows correspond to a same Protocol Data Unit (PDU) session;
wherein the duplication transmission manner of the one or more QoS flows comprises:
a manner of performing, by the electronic device, duplication and transmission processing on a data packet in the one or more QoS flows;
wherein when the electronic device is a User Equipment (UE), the manner of performing, by the electronic device, duplication and transmission processing on the data packet in the one or more QoS flows comprises:
sending, by a second Packet Data Convergence Protocol (PDCP) entity of the electronic device, a data packet having a serial number (SN) to a first PDCP entity of the electronic device; and
performing, by the first PDCP entity, duplication and transmission processing on the received data packet based on the SN;
wherein the first information is used to indicate the second PDCP entity to send a data packet corresponding to a third QFI having a mapping relationship with a second QFI to the first PDCP entity.

12. The non-transitory computer-readable storage medium of claim 11, wherein the manner of performing duplication and transmission processing on the data packet comprises performing redundant transmission of the data packet using a core network tunnel.

13. The non-transitory computer-readable storage medium of claim 11, wherein the transmission manner of the one or more QoS flows comprises at least one of:
performing redundant transmission on the one or more QoS flows based on a core network tunnel; or
performing redundant transmission on the one or more QoS flows based on an air interface connection.

* * * * *